SELECTIVE CALLING SYSTEM OF RECEIVERS DEVOID OF WRONG CALLING

Filed Aug. 29, 1962

United States Patent Office 3,173,128
Patented Mar. 9, 1965

3,173,128

SELECTIVE CALLING SYSTEM OF RECEIVERS DEVOID OF WRONG CALLING

Yoshinobu Tatsuzawa, Osaka, Japan, assignor to Matsushita Electric Industrial Co., Ltd., Osaka, Japan, a corporation of Japan Filed Aug. 29, 1962, Ser. No. 220,332
Claims priority, application Japan, Sept. 6, 1961, 36/32,596
1 Claim. (Cl. 340—164)

This invention relates to electrical communication and more particularly to systems for selectively calling individual receivers in a telephone or telegraph system, substantially free of wrong selection.

An object of the present invention is to provide a selective calling system for individual receivers substantially free of wrong operation due to external noises and the like, thus assuring correct calling of individual receivers.

Another object of the present invention is to provide an individual-call receiver system of ralatively simple construction and of relatively high selection speed, with an effective immunity to noise.

There are other objects and particularities of the present invention, which will best be understood from the following detailed description of the invention, when read with reference to the accompanying drawings, in which.

In a known calling system, a particularized code signal consisting of a series of electrical pulses is transmitted for selecting a particular one of a plurality of receivers, and when a receiver receives a code signal peculiar to itself, that receiver is selected and starts its proper alarm or ringing operation. In such a system, there is required a relatively short period of time for selecting a particular receiver, but in case an external noise equivalent to the calling code signal should affect the system, the corresponding receiver would be erroneously selected thus resulting in improper operation.

There is another known system, in which one and the same code signal of pulses is repeatedly transmitted for relatively a long period of time, and sporadically occurring external noises or transient signals are discriminated therefrom. Such a system provides a positive operation, but necessitates a relatively long time for completing the call, resulting in a low calling efficiency.

According to the present invention, means are provided for preventing individual receivers from responding to noise inputs other than predetermined forms of code signals of pulses required by respective receivers, without requiring long calling time, but with a high immunity to noise ability and a high calling speed, and yet with a relatively simple construction.

The present invention will be explained below with reference to the accompanying drawings by way of example, but it should be understood that the invention is not limited to the illustrated embodiments and is instead subject to modifications and changes within the spirit and scope of the appended claim.

Figure 1:
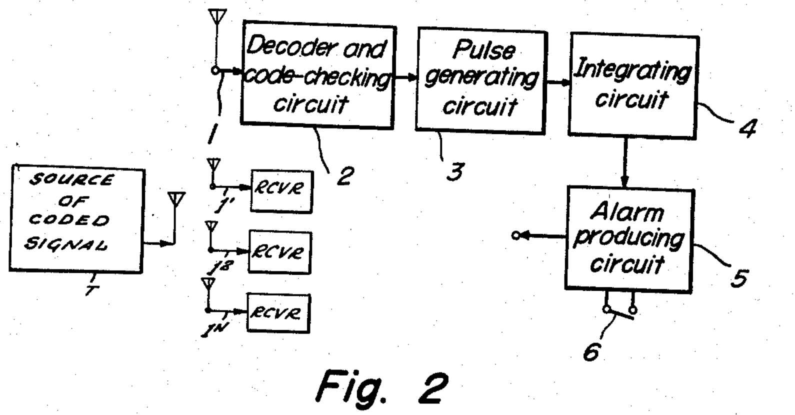
FIG. 1 is a block diagram of a single receiver in the system embodying the present invention.

Referring to FIG. 1, a group of receivers is shown each of which comprises a decoder and code-checking circuit 2 which receives at its input 1 (the inputs of the other receivers are indicated at $1^1, 1^2 \ldots 1^N$) a series of a predetermined number of identical form of code signals of successive electrical pulses transmitted from a transmitter, T. The circuit 2 decodes the code signals, and when the signals agree with the predetermined code required by the receiver, it generates a trigger pulse for each of the code signals to actuate a pulse generating circuit 3 coupled thereto. The pulses thus produced are introduced into an integrating circuit 4, in which the pulses are integrated to provide a waveform in the form of ascending stairs. When a predetermined number of such integrated pulses have established a predetermined potential within a predetermined length of time, the integrating circuit provides an effective output to actuate a continuous alarm producing circuit 5 for calling out the receiver. The circuit 5 operates continuously to provide the call alarm until a confirmation button switch 6 is operated.

Figure 3:
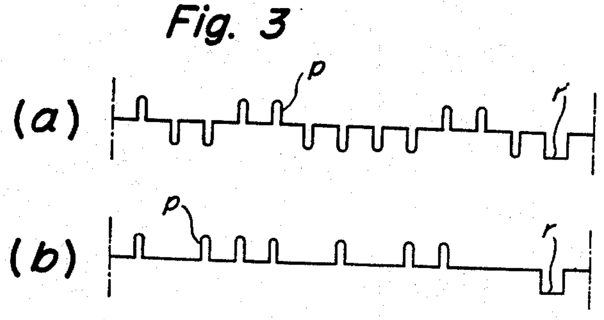
FIG. 3 shows two examples of code signals formed by a plurality of successive electrical pulses.

According to the invention, a predetermined number, say three, of code signals of identical form, each of the receivers are sent out successively from the transmitter. The forms of code signals are particularized to respective receivers. Referring to FIG. 3, the code signal may be formed by a plurality of electrical pulses of a definite rate of repetition, respective pulses being made positive or negative according to a predetermined pattern particular to an individual receiver, as shown in FIG. 3*a*, or being selectively suppressed according to a predetermined schedule particular to an individual receiver, as shown in FIG. 3*b*. Each code signal also has at the tail end a read out pulse *r*.

A series of a predetermined number, say three, of successive code signals, as shown in FIG. 3*a* for example, are received by the decoder and code-checking circuit 2. The circuit 2 may comprise a shift register, known per se, having a plurality of memory elements same in number with the number of pulses *p* of each code signal, and the read out pulse *r* at the end of each code signal effects reading and clearing of the memory. If the memory of the shift register coincides with the code form particular to the receiver, a trigger pulse is produced and supplied to the pulse generator circuit 3, but if not, no trigger pulse is produced.

Figure 2:
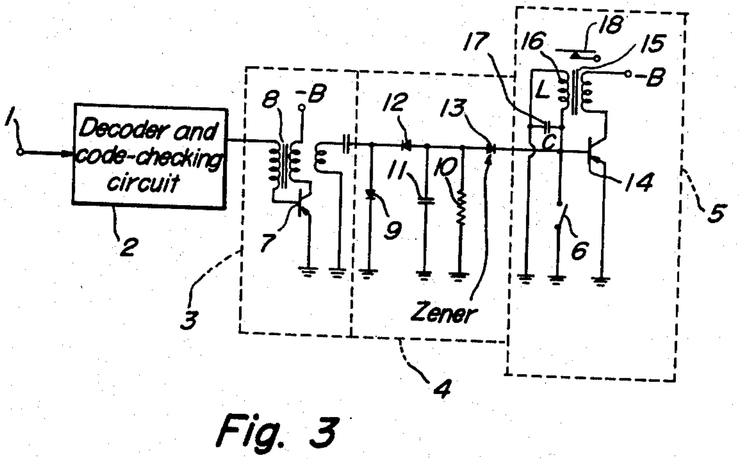
FIG. 2 shows diagrammatically the circuit of the receiver shown in FIG. 1.

Referring now to FIG. 2, the pulse generating circuit 3 may be a known one-shot blocking oscillator comprising a transistor 7 and an oscillating transformer 8, for producing one pulse for one trigger pulse applied thereto. The pulses thus produced are supplied to the integrating circuit 4 which comprises a diode 9 having its anode coupled to the output of the pulse generator circuit 3 and its cathode connected to ground; a diode 12 having its cathode coupled to the output of the pulse generator circuit 3 and its anode connected through a resistor 10 and a capacitor 11 in parallel to ground, and to a Zener diode 13 having its anode connected to the anode of diode 12. The Zener diode 13 functions to increase the dynamic range of stable action of the input voltage due to temperature changes, etc. The diodes 9 and 12 operate to charge the capacitor 11 by one step of stairs for each pulse supplied from the pulse generating circuit 3. The resistor 10 acts to discharge the capacitor 11 with a suitable time constant. In practice, the reverse resistances of diodes 9 and 12, as well as the resistance of Zener diode 13 will act in parallel with the resistor 10, and the discharge resistor 10 should be designed taking these factors into account. The potential of the capacitor 11 thus rises to above a predetermined value only when a number of pulses more than a predetermined number are successively applied to the circuit 4 within a predetermined period of time, upon which the Zener diode 13 breaks down to supply a trigger current to the continuous-alarm producing circuit 5. The circuit 5 may be a known feedback oscillator comprising a transistor 14, an oscillating transformer 15, and other elements. The transistor 14 is normally biased not to conduct collector current, so that normally there is generated no oscillations. However, when a trigger current is supplied to the base of the transistor 14 from the integrating circuit 4, a collector current flows through the transistor 14 to start the oscillations. The inductance L of the secondary winding 16 of the oscillating transformer 15 and the capacitance C of a capacitor 17 connected in parallel with the secondary winding 16 form a tank circuit to provide a fly-wheel effect which maintains the circuit in continuous oscillation. A vibrating plate 18 disposed adjacent to the transformer 15 continuously vibrates by virtue of the oscillating leakage flux of the transformer 15 to provide a continuous alarm. The confirmation button switch 6 is disposed between the base of transistor 14 and ground, and if temporarily closed, the transistor 14 returns to its normally biased condition and the oscillation stops.

Thus, according to the present invention, a predetermined number, say three, of identical code signals are successively transmitted, and a receiver only responsive to those code signals is selectively operated to produce three successive trigger pulses. The trigger pulses in turn are supplied to generate three successive pulses, and an integrating circuit having a predetermined time constant integrates the pulses to establish a definite Zener potential within a predetermined period of time to actuate an alarm producing circuit.

In practice, experimental research shows that, in average cities, external noises having tendencies to affect the calling by virtue of having their shapes equivalent to the calling code signals occur at an average rate of one every several seconds, and such external noises cause wrong callings. According to the invention, however, it has been confirmed after experimental use that substantially no wrong calling occurs, if three identical code signals are successively transmitted and received. In order to further increase the noise immunity of the present invention, it is preferable to send out four identical and successive code signals from the transmitter, and to have the integrating circuit 4 of each receiver provide an alarm actuating pulse when three pulses have been supplied thereto from the pulse generator circuit 3. With such an arrangement, even when one of four code signals should become ineffective due to external noises, a correct calling would be insured, and there is practically no chance of wrong calling.

What I claim is:

Apparatus comprising a plurality of receivers each responsive to a particular code signal repeated a predetermined number of times, each signal comprising a plurality of code elements, and transmitting means for selectively generating the code signals and transmitting the same repeatedly for said number of times within a predetermined time period; each of said receivers comprising decoder means, a pulse generating circuit, said decoder means being coupled to said circuit, said decoder means receiving the signals transmitted by said transmitting means and responding to the code signal particular to the corresponding receiver to actuate said pulse generating circuit to generate a pulse, integrating means coupled to said circuit to total pulses received from said circuit, and alarm producing means coupled to said integrating means to produce an alarm when said integrating means receives within said predetermined period of time a number of pulses corresponding to said predetermined number, said alarm producing means including means for producing a continuing alarm when actuated and manually operable means for terminating said alarm.

References Cited by the Examiner

UNITED STATES PATENTS

| | | | |
|---|---|---|---|
| 2,697,823 | 12/54 | Undy | 340—164 X |
| 2,760,134 | 8/56 | Johnson | 340—164 |
| 2,942,189 | 6/60 | Shea et al. | 317—148.5 |
| 2,947,916 | 8/60 | Beck | 317—148.5 |
| 3,106,667 | 10/63 | Winchel | 307—88.5 |

OTHER REFERENCES

Silliman et al. German application, 1,091,910, printed Oct. 27, 1960.

NEIL C. READ, *Primary Examiner.*